United States Patent [19]

Livermore et al.

[11] Patent Number: 4,935,629

[45] Date of Patent: Jun. 19, 1990

[54] DETECTOR ARRAY FOR HIGH V/H INFRARED LINESCANNERS

[75] Inventors: Kenneth A. Livermore, Andover; William L. McCracken, Wayland, both of Mass.

[73] Assignee: Honeywell Inc., Minneapolis, Minn.

[21] Appl. No.: 261,354

[22] Filed: Oct. 24, 1988

[51] Int. Cl.$^5$ .............................................. H01L 25/00
[52] U.S. Cl. ................................. 250/349; 250/332; 250/334; 358/109
[58] Field of Search ............... 250/332, 334, 347, 349, 250/370.80, 253; 358/109

[56] References Cited

U.S. PATENT DOCUMENTS 4,155,007 5/1979 Beckmann ........................... 250/253

Primary Examiner—Carolyn E. Fields
Assistant Examiner—David P. Porta
Attorney, Agent, or Firm—Haugen and Nikolai

[57] ABSTRACT

A detector array for use in an infrared linescanner system. The system scans an area of ground below an aircraft. The detector array comprises a linear array arranged in a symmetrical pattern about a centerline and has an angular overall length sufficient to provide contiguous coverage of the scanning area for a maximum specified velocity-to-height ratio.

12 Claims, 2 Drawing Sheets

X = DETECTOR SIZE

DETECTOR ARRAY FOR HIGH V/H INFRARED LINESCANNERS

BACKGROUND OF THE INVENTION

This invention relates to the field of infrared sensitive imaging apparatus and more particularly to infrared linescan sensors for airborne reconnaissance.

Infrared linescan sensors have established themselves as one of the preferred sensors for airborne reconnaissance. They are capable of obtaining valuable tactical reconnaissance imagery during both day and night and under atmospheric conditions which preclude the use of conventional photographic or television-type electro-optical sensors. The value of this tactical imagery has been recognized by potential enemies so that they have equipped their forces with very extensive and effective anti-aircraft capability. Manned and unmanned reconnaissance aircraft have been forced to fly at extremely low altitudes with high velocity in order to increase their probability of survival. The velocity-to-height ratio (V/H) thus becomes a dominant factor in specifying and designing any sensor for such a low altitude, high V/H imagery collection mission.

In a linescan infrared sensor this is particularly true, because in such sensors, the transverse scan is accomplished by the rotation of a facetted scan mirror which has from 2 to 4 facets in typical designs known to the art. The transverse scan motion is repetitive as the mirror rotates at constant RPM. The scan motion in the other direction is accomplished by the forward motion of the aircraft which is usually taken to be constant. At very low values of V/H, it is sufficient to scan with a single infrared detector in order to cover the ground below the aircraft in a complete, or contiguously sampled manner. As the V/H increases to progressively higher values, the sampling rate must increase so as to avoid having gaps in the alongtrack, or flight, direction. By adding more detectors in a linear array parallel to the flight track, it is possible, in theory, to configure a sensor which could meet any required V/H expected in the near future using our present aircraft technology.

In actual practice there is a limit to the number of infrared detectors which can be used. There are a number of reasons why this is so. One of the most important being that of high cost. The infrared detectors used in such systems are themselves very expensive. In addition, each detector requires a preamplifier and, in the typical case of a photoconductive detector, individual detector bias circuits are required as well. The signal chain does not usually stop at the preamplifier. There are postamplifiers with automatic gain control, level clamping and automatic level adjust circuits. It also is necessary to equalize all channels to provide an equal output signal for an equal input radiance. Each of the above-described circuits add cost and complexity to the sensor. Given the above factors, there is a clear need to minimize the number of detector channels in parallel.

In most tactical airborne reconnaissance sensors, one of the chief problems has been that such sensors generate enormous data rates. The instantaneous data rate of the one such known system, for example, is 15.2 MHz. If this analog data were to be digitized into eight bit words, for example, the bit rate would be $30.4 \times 8 \times 10 = 243.2$ megabits/sec. Some reduction in bit rate is possible using data stretching to fill the dead time of the scan line to line period, but even when this is done, the resulting data rate is excessively large for image manipulation, data linking, tape recording, or real-time display on a cathode ray tube. The invention provides a data rate reduction which matches the resolution in the end product imagery to the requirements of the human interpreter and to the limitations of the real image produced at the sensor focal plane.

SUMMARY OF THE INVENTION

The invention provides a novel detector array for use in an infrared linescanner system. According to the invention, a plurality of detectors are arranged in a linear array in a symmetrical spacing relationship about a centerline. The array has an angular overall length structured to provide contiguous coverage of the scanning area for a maximum specified V/H ratio.

The array has an effective angular substense in alongtrack direction defined by dividing the maximum velocity-to-height ratio by the scan rate. The array of detectors comprises detector elements in which the individual detector face sizes are all equal. Detectors are arranged in a bilaterally symmetrical linear array with intercell spacings which increase in a non-linear progression outwardly from the center line of the array.

OBJECTS OF THE INVENTION

It is one object of the invention to provide a novel arrangement of detectors in a linear array which minimizes the number of detectors needed for any specified viable V/H.

It is a further object of the invention to minimize the number of output channels of signal data in an infrared linescanning system while still providing complete and continuous coverage of the ground below a moving aircraft.

It is still a further object of the invention to produce a manageable data rate in an infrared linescanning system, thereby reducing associated electronic circuitry, weight and cost of such a system.

It is still a further object of the invention to provide a data rate which is reduced in comparison to data rates using known systems but which nevertheless matches the resolution required in the end-product imagery to the requirements of the human interpreter and to the limitations of the real image produced at the sensor focal plane.

Other objects, features and advantages of the invention will be readily appreciated as the same become better understood by reference to the following detailed description when considered in connection with the accompanying claims and drawings in which like reference numerals designate like elements throughout the figures thereof.

DESCRIPTION OF THE PREFERRED EMBODIMENT

Figure 1:
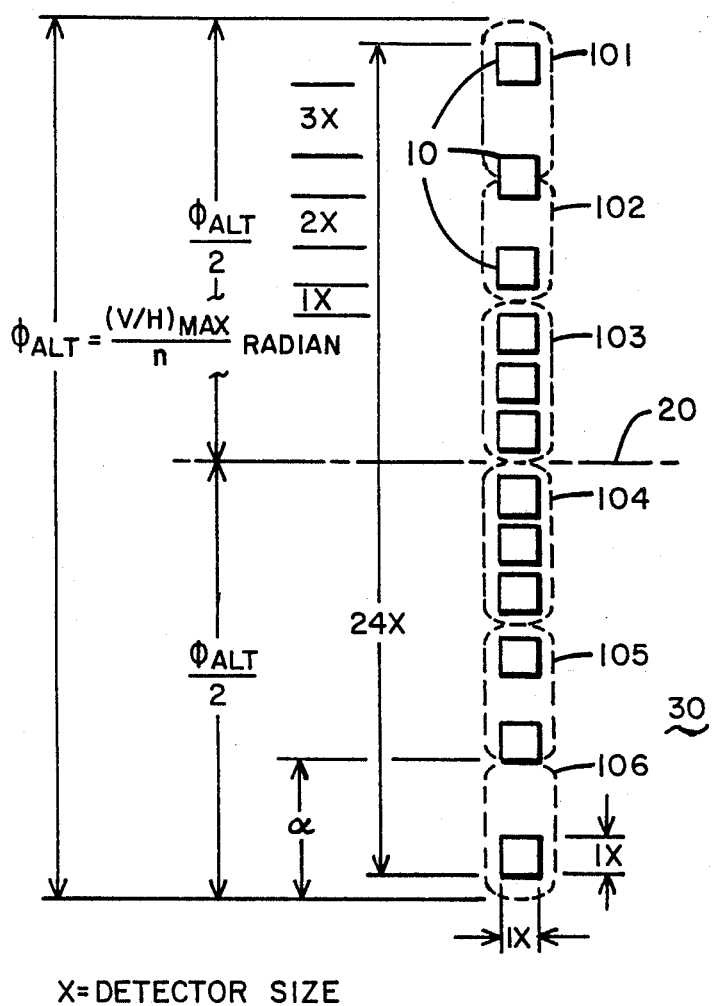
FIG. 1 shows schematically a block diagram of one embodiment of the detector array of the invention.

The invention consists of a linear detector array, one embodiment of which is illustrated schematically in FIG. 1, which has an angular overall length sufficient to provide contiguous coverage of the ground below the aircraft for the maximum specified V/H. The array angular subtense in the alongtrack (ALT) direction is found by dividing the maximum V/H by the number of scans per second.

For example, consider a maximum V/H of 2.0 radians/sec. If a four-sided scan mirror is used at a spin rate of 6000 RPM, there will be 400 scans/sec. The array angular subtense must therefore be:

$$\phi_{ALT} = 2/400 = 0.005 \text{ radian} = 5 \text{ mr.} \quad (1)$$

Known systems usually assumed that this angular coverage should be filled with individual detector cells so that the full ground distance would be completely sampled. The array of the invention exploits the fact that in any practical infrared linescan sensor design, the optics will consist of a fixed infinity focus simple telescope placed behind a simple object-space mirror scanner (not shown). It is important to understand the working of the invention to note that any linescanner scans a swath of the earth below the aircraft which contains features or targets at a wide variety of object distances. Most infrared linescanners use one or, at the most, two parabolic mirrors as the focusing element in the optics. The detector focal plane is almost always placed at the infinity focus of the parabola. In low altitude high V/H penetration reconnaissance missions, it is necessary to scan almost from one horizon to the other. Therefore, the optics will be in focus only at the high scan angles near the horizons. At the low altitudes used in such missions, there will be a considerable amount of image defocus for that portion of the scan directly below the aircraft (during the nadir portion of the scan). At intermediate scan angles between nadir and either horizon, the amount of image defocus will diminish in a nonlinear but progressive manner similar to the focus scale on an ordinary photographic camera. The amount of defocus is estimated by virtue of the fact that it is directly proportional to the size of the aperture. The aperture of most infrared linescanners is rectangular with the alongtrack (ALT) dimension being larger than the acrosstrack (ACT) dimension. The ALT dimension is usually set to be the length of the scan mirror. The ALT defocus can be understood to be the projection of this aperture on the ground. For example, if the ALT dimension of the scan mirror is 5 inches, the defocus effect will limit the ALT resolution to this value at the ground regardless of the position of the line-of-sight in the scan and regardless of the altitude. The angular measure of this defocus will vary with the slant range to the ground. The angular subtense of the ALT aperture defocus is thus:

$$\alpha = \frac{(D/12) \cdot 10^3}{R} \text{ mr, where } D \text{ is the ALT aperture} \quad (2)$$

in inches and R is the slant range to the ground in feet and is equivalent to the altitude, H, divided by $\cos \theta$ where $\theta$ is the scan angle measured from nadir. $\theta = 0$ degrees at nadir. The invention exploits this defocus effect in order to reduce the required numbers of individual detectors in the array.

FIG. 1 illustrates one embodiment of a linear array of detectors as employed by the present invention. Other embodiments of the invention may be used and will become apparent to those skilled in the art from considering the examples shown herein. Two such alternate embodiments of the invention are described in detail herein with reference below to FIGS. 2 and 3.

Again referring to FIG. 1, a linear array of infrared detectors 30 is shown. The array comprises a plurality of detectors 10 which are symmetrically located in a linear fashion on either side of a centerline 20. The centerline 20 may advantageously coincide with the optical axis of an infrared linescanning system (not shown) in which the invention may be deployed. Such a stretched linear array yields about a 2:1 increase in V/H for the same scan rate.

Still with reference to FIG. 1, the angular subtense of the linear array is shown. This angular subtense, $\phi_{ALT}$, is determined by the following equation:

$$\Phi_{ALT} = \frac{(V/H)_{max}}{n} \quad (3)$$

where n = the scan rate in scan-per-second.

In one embodiment of the linear array as shown in FIG. 1, the plurality of detectors may advantageously number twelve with an equal number of detectors disposed on either side of the centerline 20. In this embodiment, the individual detector sizes may all be equivalent and the detectors are arranged in a symmetrical linear array with intercell spacings which increase in a nonlinear progression starting from the centerline as the center of symmetry, and progressing outwardly from the centerline. Such increasing nonlinear spacing provides optimum sampling by a line scan sensor of the ground below an aircraft once such aircraft is flying at very low altitudes and at high velocities. In such cases, the V/H ratio is highest at the nadir portion of the scan line and is found to decrease symmetrically at either side of nadir in direct proportion to the cosine of the scan angle difference from nadir, i.e., the nadir is at zero degrees. The V/H ratio also decreases in proportion to the altitude, H, assuming a constant aircraft velocity.

FIG. 1 also shows, in dotted line, groupings overlaying detectors and detector spacings, 101–106. Each of these groupings represent an equally spaced pixel or resolution element as determined by the scanner aperture operating in a fixed-infinity-focus optical system with a finite object distance, R, which produces a defocus in accordance with equation (2) hereinabove. As shown in the embodiment of the invention depicted in FIG. 1, the total detector array spans a distance of 24x in the ALT direction, with each resolution element spanning a distance of 4x (or four times the detector size, x).

Figure 4:
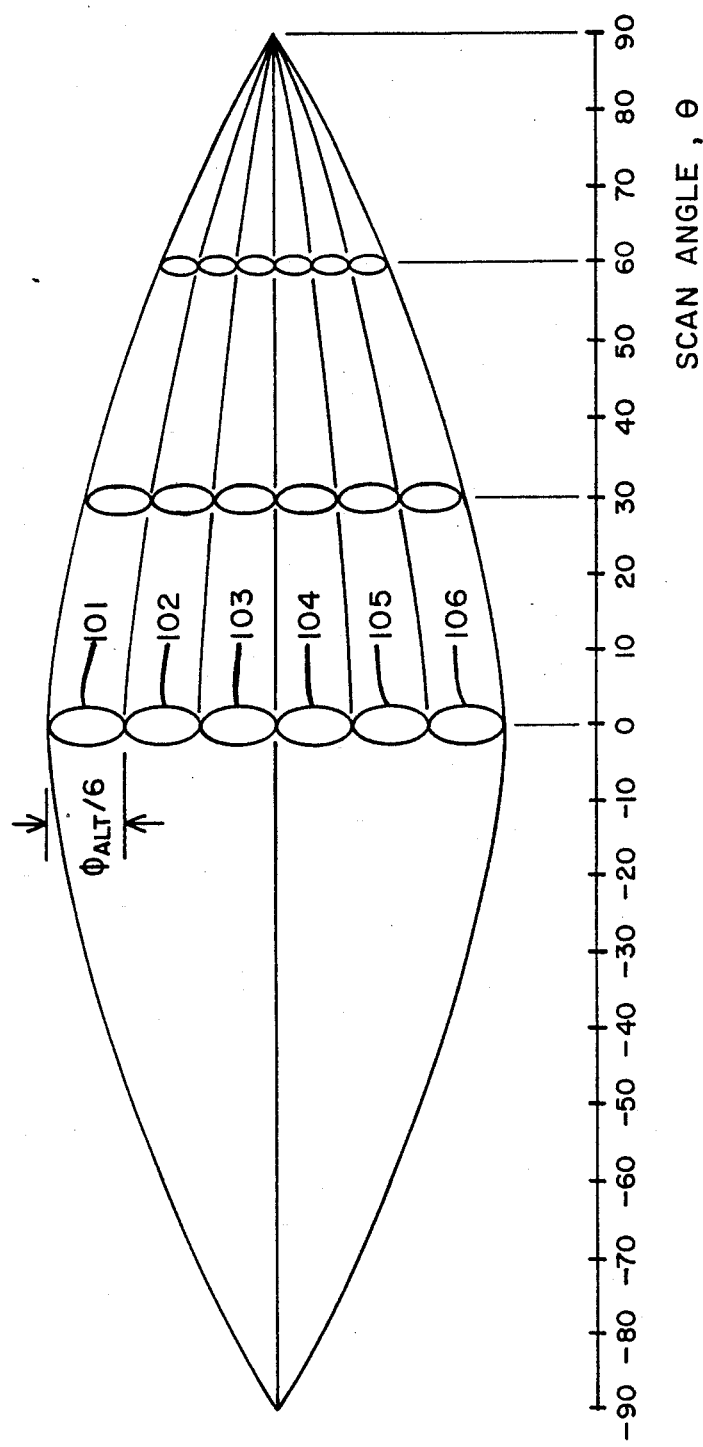
FIG. 4 shows schematically the effect of angular subtense of defocused pixels as scan angle $\theta$ varies from $-90°$ to $+90°$.

Now referring to FIG. 4, the groupings 101–106 are shown again, together with a schematic depiction of the effect of angular subtense of defocused pixels as scan angle $\theta$ varies from $-90°$ to $+90°$. FIG. 4 is a diagram showing the variation in angular subtense of the distance traveled by the aircraft during a single scan period of the linescanner carried by the aircraft. This distance, when projected on the ground, subtends an angle $\phi_{ALT}$ which varies as the cosine of the acrosstrack scan angle, $\theta$, where $\theta$ is referenced to nadir (i.e., $\theta = 0$ degrees).

The slant range, R, also varies with the scan angle and is given by $R = H/\cos \theta$. The scanner uses a fixed focus optical system that is focused for an indefinite object distance ($R = \infty$). Closer values of R will produce defocused images in which the amount of defocus increases in a nonlinear manner as the object distance, R, is shortened. The amount of blur, or loss of resolution, is mathematically described by the point spread function which includes a defocus function as its major component in the application pertinent to the invention. The defocus is easily computed with accuracy sufficient for practical uses by noting that the rectangular aperture of the linescanner when projected on the ground at distances R will subtend an angle $a_B$ which is a function of the slant range R. In one embodiment of the invention, the aperture is the superposition of two rectangular apertures (a left and a right aperture) in which the alongtrack ALT aperture is constant and larger than either of the two across track ACT apertures. The two ACT apertures are equal at nadir and differ elsewhere, varying with the scan angle from nadir. For the case at nadir, the two equal apertures are superimposed and appear as a single aperture of dimensions equal to one of them. The aperture when projected on the ground collects radiance from all points within the aperture projection and focuses this radiance into a single blur pattern in the focal plane. It is, therefore, impossible to distinguish points on the ground which fall within the projected aperture. The angular subtense of the projected rectangular aperture is different in the two dimensions at the rectangular aperture because the ALT aperture is always larger than the effective superimposed ACT aperture. The two subtense angles for nadir are given by:

$$\phi_y = D_y/H \quad (4)$$

$$\phi_x = D_x/H \quad (5)$$

where $\phi_y$ = ALT angular subtense of defocus blur pattern
$D_y$ = ALT aperture size
H = aircraft (scanner) altitude
$\phi_x$ = ACT angular subtense of defocus blur pattern
$D_x$ = ACT aperture size. At other scan angles where $\theta = \theta_i$ we have $$\phi_y = \frac{D_y}{H/\cos\theta_i} = \frac{D_y \cos\theta_i}{H} \quad (6)$$

and $$\phi_x = \frac{D_x \cos\theta_i}{H} \quad (7)$$

In one primary embodiment of the invention, we have discovered that by proper choice of the ALT aperture $D_y$, it is possible to obtain complete sampling of the scene using six parallel signal channels, shown as 101–106 in FIG. 4. The defocus effect is exploited in the invention to this end because it limits the attainable ground resolution to the value imposed by the projection of the ALT aperture, $D_y$. If the aircraft velocity is, for example, V = 1000 ft./second and one chooses a 2.5 millisecond scan period, the aircraft will move forward 2.5 feet during a single scan period. This distance creates a swath on the ground which must be imaged by transverse scanning. Successive repeated scans form the desired strip map image of the terrain overflown by the aircraft. A single transverse swath could be as wide as from the left horizon to the right horizon or it could be less depending on the application. In a single swath, the ALT dimension in this example is 2.5 ft. or 30 in. If we choose, for example, an ALT aperture of $D_y = 5$ in., we can effectively resolve six equal pixels or resolution elements 101–106, each of which has an ALT dimension of 5 in. as determined by the ALT aperture. This is shown in FIG. 4 where the six equal pixels are shown for three values of the scan angle $a$, namely at nadir, 30 degrees and 60 degrees, respectively. It is to be understood that all for all other values of positive and negative scan angles the six equal pixels would subtend individual angles depending on the specific value of $\theta$. This variation is indicated in FIG. 4 by the curved lines giving the outline of the pixels. Since the pattern is symmetric left and right, the pixels and their curved lines are not shown for the negative values of the scan angle.

It is this pattern of defocused pixels which is sampled by scanning the array of the invention. It is a feature of the invention that it is not necessary to provide contiguous detectors in the ALT dimension in order to obtain complete informational sampling of the scene being imaged. It is only necessary to place or scan a detector within a central 2/3 region of the ALT dimension of each blur pattern. It is key feature of the invention that the sampling detectors need not be at the centers of the ALT blur dimension by virtue of our discovery that the defocus optical pattern has an approximately uniform intensity within the central approximate 2/3 region of the pattern. Only the ALT dimension is of concern because the complete ACT dimension of the blur pattern is traversed by any detector sampling that pattern by virtue of the transverse scanning.

It is also to be understood that in one embodiment of the invention it is advantageous to use a particular value of the ALT aperture and particular values for the scan period to allow the use of six parallel signal channels arising from a choice of six out of a possible twelve detectors in a linear array, it is also possible to choose other values for the ALT aperture, the scan period and the consequent number of channels. The choice of other parameter values does not detract from the advantages and features of the invention. For example, in some applications, a smaller value of the ALT aperture, D, could be selected which choice would lead to a smaller ALT defocus blur size. For the same aircraft V/H ratio and the same scan period, it would be possible to resolve a larger number of pixels within the distance moved by the aircraft during a single scan period. In a particular example, it would be possible to resolve eight or more pixels and it would, therefore, be appropriate to use eight or more signal channels. In such an application, the detector spacing and numbers of detectors in the arrays shown in FIGS. 1, 2 and 3 would be altered for the application. It is also to be understood that in one desirable embodiment of the invention, it is possible to retain six channels of information from six appropriately chosen detectors even with slight variations from the optimum scan period. Specifically, we have discovered in one embodiment of the invention that ALT aperture of 5.115 in. will provide effective imaging with six channels of signal processing.

Figure 3:
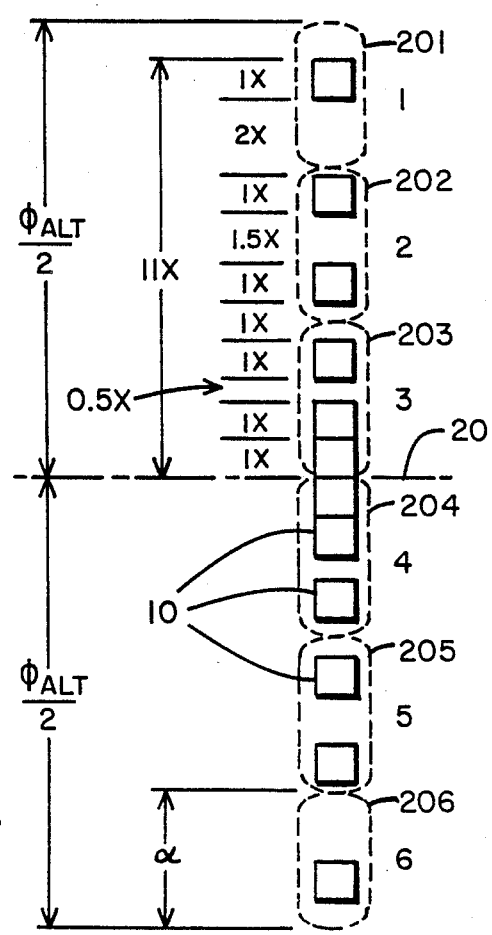
FIG. 3 shows schematically a block diagram of an alternate embodiment of the detector array of the invention.

It should be noted that although the individual detectors are shown closely spaced in the central portion of the example embodiments of the linear arrays are shown in FIGS. 1 and 3, with currently available infrared detector technology it is necessary to provide a minimum spacing between individual detector cells of approximately 0.5 mil inch to assure proper electrical and optical isolation between adjacent detector cells. The detectors may be comprised of any material capable of detecting radiation, including, for example, detectors comprised of mercury cadmium telluride material operating in the photoconductive or photovoltaic mode.

With reference to FIG. 3, an alternate embodiment of the invention is shown in which there are four closely spaced detector elements in the central portion of the twelve element linear array as compared to the six central closely spaced elements of FIG. 1, denoted as Group A. In the embodiment shown in FIG. 3, each of the detector elements are of equal size denoted by "x". The total alongtrack array subtense, $\phi_{ALT}$, is determined by the equation:

$$\phi_{ALT} = \frac{(V/H)_{max}}{n} \text{ radian} \qquad (8)$$

The geometric subtense of the array is slightly less than $\phi_{ALT}$ because it is only necessary to sample the defocused resolution elements in order to gain sufficient information for an image. Each defocused element subtends an angle, $\alpha$, in the alongtrack direction. This is known in the art as the point (or line) spread function. The effective resolution of each detector is then $w' = w + \alpha$ where w is the geometric subtense of each detector and $\alpha$ is the defocus contribution. The defocus influence produces an approximately uniform intensity distribution over the central 70% of the angle $w'$ so that sampling inside the region provides the required information for a useful image.

FIG. 3 shows the preferred spacing of the elements wherein the geometric array subtense is 22x and $\phi_{ALT}$ is somewhat larger. The array is bisected by the centerline 20 into equal lengths of 11x on either side of the centerline. The elements are spaced as shown where on each side of the centerline the first two elements are positioned adjacent to one another, the third elements from the centerline are spaced a distance 0.5x from the second elements, the fourth element from the centerline is spaced a distance of 1.0x from the third element, the fifth element is spaced a distance of 1.5x from the fourth element and the last element is spaced a distance of 2x from the fifth element, the total subtense for the elements of the whole linear array of twelve elements being 24x. In this example, x represents the length or width of the detector elements in either dimension and may also be expressed as IFOV in milliradians. For example, if x represents the angular subtense of the linear detector array, x may have a value in the range of about 0.1 milliradian to 1.0 milliradian. Further, the detector angular subtense of each detector may vary such that the acrosstrack and alongtrack dimensions are not equal and may vary up to 33% since $X_{ALT} = X_{ALT} \pm 0.33 X_{ALT}$ can be considered the maximum degree of deviation from a square angular subtense. x may be about 0.3 mr for a typical detector. The acronym IFOV is known in the art to represent the geometric instantaneous field-of-view (subtense) of the detector.

Note that the symmetrical linear array of elements shown in FIG. 3, similar to the array shown in FIG. 1, comprises six equally spaced resolution elements, 201–206, as depicted by the dotted lines. The resolution elements are equally spaced as determined by the scanner aperture operating in a fixed-infinity-focus optical system with a finite object distance, R, which produces a defocus in accordance with the relationship shown in equation (2). It should be recognized that if additional detectors were placed in the open spaces between the detectors shown in the figures, such additional detectors would not contribute any significant new information to the scanning system.

Figure 2:
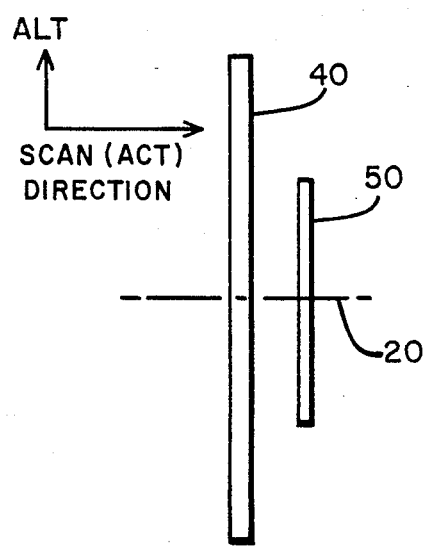
FIG. 2 shows schematically a block diagram of an alternate embodiment of the invention including two linear detector arrays as employed by the invention.

Referring now to FIG. 2, another alternate embodiment of linear detector arrays as implemented by the invention is shown. In FIG. 2, a first linear array for wide mode scanning 40 is shown spaced a suitable distance from a second linear array 50 for fine scanning at two times or more resolution wherein the second linear array 50 is shorter than the first linear array 40. The first and second linear arrays are each disposed about a centerline 20 and each have an angular overall length sufficient to provide contiguous coverage of the scanning area for a maximum specified V/H. The angular length of the two arrays may be determined as described in the equations referenced above with FIG. 1 or FIG. 3. The two arrays 40 and 50, respectively, may advantageously have the size ratio 2:1 but other sizes are possible depending upon the application. In actual use, an embodiment such as is shown in FIG. 2 has the two array patterns placed side-by-side in the same focal plane to allow manual or automatic switching (not shown) from the larger detector size to the smaller for finer resolution. For example, in a typical application, the two arrays may be spaced at a distance of S, where S may range from about 6x to x. The wide mode array may have a width in the scan direction of about 2x, while the high resolution array may be typically of width 1x. Those skilled in the art will recognize that the aforementioned spacing and widths are typical values and that other spacings and widths may be used depending upon the scanning system parameters.

The invention has been described herein in considerable detail in order to comply with the Patent Statutes and to provide those skilled in the art with the information needed to apply the novel principles and to construct and to use such specialized components as are required. However, it is to be understood that the invention can be carried out by specifically different equipment and devices, and that various modifications, both as to equipment details and operating procedures can be accomplished without departing from the scope of the invention itself.

What is claimed is:

1. A detector array for use in a fixed-infinity-focus infrared linescanner system in an aircraft having an alongtrack axis parallel to the line of flight of the aircraft, wherein the linescanner system has [having] a radiation-sensitive scanning area and an angular scan rate, comprising a plurality of individual detectors arranged in a linear array in a bilaterally symmetrical pattern about a centerline and having an [angular] overall length and array orientation in the alongtrack axis, wherein said axis is defined as said array being structured and arranged so as [sufficient] to provide contiguous coverage of the scanned scene without gaps between successive scans for a range of aircraft velocity-to-height ratios up to a maximum specified velocity-to-height [scanning area for a maximum specified V/H] ratio.

2. The appartus of claim 1 wherein the detector array has an effective angular subtense in the alongtrack axis wherein said effective angular subtense is defined by dividing the maximum velocity-to-height ratio by the angular scan rate [direction defined by dividing the maximum V/H by the scan rate].

3. The apparatus of claim 2 wherein the detectors are comprised of mercury cadmium telluride material operating in either the photoconductive or the photovoltaic mode.

4. The apparatus of claim 1 wherein the array of detectors comprises detector elements in which the individual detector face sizes are all equal and wherein the detectors are arranged in a bilaterally symmetrical linear array with intercell spacings which increase in a nonlinear progression outwardly from the centerline of the array.

5. The apparatus of claim 4 wherein the detector array is comprised of twelve elements.

6. A detector pattern for use in an infrared linescanner system having a scanning area wherein the detector pattern comprises:
 (a) a first linear array for wide mode scanning;
 (b) a second linear array for fine resolution scanning wherein the second linear array is shorter than the first linear array; and
 (c) wherein the first and second linear arrays each have a centerline and an angular overall length sufficient to provide contiguos coverage of the scanning area for a maximum specified velocity to height ratio.

7. A detector array pattern for use in an infrared linescanner system in an aircraft having an alongtrack axis parallel to the line of flight, wherein the linescanner system has a scanning area wherein the detector array pattern comprises:
 (a) a first linear array used for wide mode scanning;
 (b) a second linear array used for fine resolution scanning wherein the second linear array is shorter in alongtrack axis angular subtense than the first linear array and wherein each of the individual detector elements comprising the second linear array subtend a smaller angle in the alongtrack axis than that of the corresponding element in the first linear array; and
 (c) first and second linear arrays in accordance with (a) and with (b) wherein said first and second linear arrays each have a common centerline and wherein each has an overall length structured to have an angular subtense structured to provide contiguous coverage of the scanned scene at the maximum velocity-to-height ratio specified for the use of either said first or second linear array, and wherein the first linear array is used for providing wide angle coverage at maximum velocity-to-height ratios higher than the maximum velocity-to-height ratios used for the second array and wherein the second linear array is used to provide coverage for velocity-to-height ratios up to a lower maximum velocity-to-height ratio than that used with the first linear array.

8. A linear detector array for use in an infrared linescanner system in an aircraft, wherein the aircraft has an alongtrack axis parallel to the direction of flight and an acrosstrack axis orthogonal to the direction of flight, and wherein the linescanning system has an alongtrack scanning aperture occupied by apparatus comprising:
 (a) a plurality of detector elements arranged in at least one linear array wherein the individual detector elements of each array are positioned in a bilaterally symmetric pattern about a common centerline, wherein each of the said detector elements has a linear width, x, in the acrosstrack dimension orthogonal to the aircraft flight direction and wherein each of the said detector arrays have an alongtrack angular coverage called $\phi_{ALT}$ which is determined by the formula:

$$\phi_{ALT} = (V/H)_{MAX}/n$$

where $(V/H)MAX$ in radians per second is the maximum velocity-to-height ratio to be used by the vehicle carrying the infrared linescanner and where n is the infrared linescanner scan rate in scans per second;
 (b) wherein the plurality of detectors in any single array comprises at least twelve detectors;
 (c) wherein the geometric extent of any single array is equivalent to 22 times y, where y is the linear extent of each individual detector in the alongtrack axis parallel to the flight direction; and
 (d) wherein each linear array of infrared detectors comprises a pattern of detector placement such that a centerline of symmetry exists, said centerline being oriented in the acrosstrack axis parallel to the scanning direction, and wherein the individual detector elements are spaced such that for each side of said centerline, progressing outwardly, a first innermost detector element closest to said centerline is adjacent the centerline while a second detector is adjacent the first said element while a third detector element is spaced from the second element a distance 0.5 times y, and a fourth detector element is spaced a distance of 1.0 times y from the third element, and a fifth detector element is spaced a distance of 1.5 times y from the fourth element, and a sixth detector element is located the greatest distance from said centerline and spaced at a distance of 2 times y from the fifth detector element.

9. The apparatus of claim 8 for use in an infrared linescanner having an alongtrack optical aperture and having a plurality of channels of electrical signal processing wherein the number of active signal channels is selectable in accordance with aircraft velocity-to-height ratio such that any number of active channels from one to twelve may be selected from a linear array.

10. The apparatus of claim 8 wherein the alongtrack optical aperture is approximately 5.115 inches.

11. The apparatus of claim 8 wherein the ALT angular subtense, y, of each individual detector element is within the range of approximately 0.1 milliradian to 1.5 milliradian.

12. The apparatus of claim 8 in which the angular subtense of an individual detector element in the acrosstrack and in the alongtrack axes are not equal and vary up to about 35% one from the other dimension.

* * * * *

UNITED STATES PATENT AND TRADEMARK OFFICE
CERTIFICATE OF CORRECTION

PATENT NO.  : 4,935,629

DATED       : June 19, 1990

INVENTOR(S) : Kenneth A. Livermore and William L. McCracken

It is certified that error appears in the above-identified patent and that said Letters Patent is hereby corrected as shown below:

Column 8, Claim 1, line 55, delete "[having]".

Column 8, Claim 1, line 59, delete "[angular]".

Column 8, Claim 1, line 62, delete "[sufficient]".

Column 8, Claim 1, line 66, delete "[scanning area for a maximum specified V/H]".

Column 9, Claim 2, lines 5-6 delete "[direction defined by dividing the maximum V/H by the scan rate]".

Column 10, Claim 8, line 17 "MAX" should be in subscript.

Signed and Sealed this

Tenth Day of March, 1992

*Attest:*

HARRY F. MANBECK, JR.

*Attesting Officer*     *Commissioner of Patents and Trademarks*